(12) United States Patent
Wang et al.

(10) Patent No.: US 7,969,955 B2
(45) Date of Patent: Jun. 28, 2011

(54) METHOD AND DEVICE FOR MULTIMEDIA MULTICAST TRANSMISSION OVER A WIRELESS NETWORK

(75) Inventors: Charles Wang, Beijing (CN); Li Zou, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 873 days.

(21) Appl. No.: 11/494,134

(22) Filed: Jul. 27, 2006

(65) Prior Publication Data
US 2007/0030837 A1    Feb. 8, 2007

(30) Foreign Application Priority Data
Aug. 3, 2005  (EP) .................................. 05300647

(51) Int. Cl.
*H04W 4/00* (2009.01)
*H04B 7/216* (2006.01)
(52) U.S. Cl. ...................................... 370/342; 455/466
(58) Field of Classification Search .................. 370/342; 455/466
See application file for complete search history.

(56) References Cited

U.S. PATENT DOCUMENTS

2002/0163892 A1* 11/2002 Hassibi et al. ................ 370/310
2004/0161050 A1    8/2004 Larsson et al.

OTHER PUBLICATIONS

"Unitary Space-Time Codes From Alamouti's Scheme with APSK Signal"—IEEE Transaction on Wireless Communications, vol. 3, No. 6, Nov. 2004.*
Larsson E. G. et al. "Nonuniform Unitary Space-Time Codes for Layered Source Coding" IEEE Transactions on Wireless Communications, IEEE Service Center, Piscataway, NJ US, vol. 3, No. 3, May 2004, pp. 958-965.
Larsson, E. G.: "Unitary Nonuniform Space-Time Constellations for the Broadcast Channel" IEEE Communications Letters, vol. 7. No. 1, Jan. 2003, pp. 21-23. p. 22, section III.
Bauch G. A.: "Higher order differential matrix modulation": Information Theory, 2004, ISIT 2004, Proceedings, Internationsl Sysposium on Chicago, Illinois, USA Jun. 27-Jul. 2, 2004, Piscataway, NJ USA, IEEE, Jun. 27, 2004, pp. 189-189, XP010749900.

* cited by examiner

*Primary Examiner* — Pierre-Louis Desir
*Assistant Examiner* — Timothy Pham
(74) *Attorney, Agent, or Firm* — Robert D. Shedd; Joseph J. Opalach; Catherine A. Cooper (57) ABSTRACT

A system and a method for multimedia multicast transmission in a mobile wireless network are proposed, which can be applied in a multiple-antenna system as well as a single antenna system. The basic message and additional message are transmitted at the same time. Receivers with different capability also with different complexities are used to demodulate different message. In order to design low-complexity receiver, the signal can be demodulated noncoherently for multimedia transmission.

8 Claims, 5 Drawing Sheets

METHOD AND DEVICE FOR MULTIMEDIA MULTICAST TRANSMISSION OVER A WIRELESS NETWORK

This application claims the benefit, under 35 U.S.C. §119 of EP Patent Application 05300647.4, filed Aug. 3, 2005.

FIELD OF THE INVENTION

The present invention relates generally to wireless transmission of video, data, and speech at high rates, and particularly to a method and device for multimedia multicast transmission in wireless networks.

BACKGROUND OF THE INVENTION

How to provide reliable mobile wireless transmission of video, data, and speech at high rates to many users has been intensively studied in recent years.

One known system and method for improving video transmission over a wireless network is disclosed in PCT application number PCT/EP01/01878 (publication number WO 01/65848, referred hereafter as D1). As disclosed, D1 is tailored to solve video transmission problems in RF band and the system proposed is limited to single antenna system.

Michael B. Pursley developed one approach using nonuniform M-ary Phase-Shift-Key (M-PSK) constellation in multicast transmission of multimedia message to receivers of different capabilities (Michael B. Pursley, John M. Shea, "Nonuniform Phase-Shift-Key Modulation for Multimedia Multicast Transmission in Mobile Wireless Networks," IEEE Journal on Selected Area in Communications, VOL. 17, No. 5, May 1999). The system is based on one transmitter antenna and one receiver antenna. So its spectral efficiency and performance are limited.

Erik G. Larsson proposed a new differential space-time codes tailored to point-to-multipoint, or broadcast, communications using layered source coding (Erick G. Larrson, "Nonuniform Unitary Space-time Codes for Layered Source Coding," IEEE Trans. On Wireless Communications, VOL. 3, No. 3, May 2004). The transmission of an additional message incurs performance degradation and the selection of signal constellation is limited.

One known way to get high rates on a wireless wideband channel is to use multiple transmitter and/or receiver antennas. Multiple Input Multiple Output (MIMO) technology significantly enhances system performance. Using proper space-time coding, it is possible to use the degrees of freedom of the MIMO channel both to increase the throughput and to counteract fading. Space-time coding and modulation strategies have recently been adopted in 3G cellular standards (e.g., CDMA2000 and WCDMA) and have also been proposed for wireless local loop (Lucent's BLAST project) and wide-area packet data access (AT&T's Advanced Cellular Internet Service). However, multiple antenna deployment requires multiple RF chains.

Another fact should be noted that distinct receivers have different capabilities of decoding a message, which suggests that the transmitted signal should consist of several components which are of different importance for the reconstruction of the message. Then came the concept of layered source coding and multilevel-modulation. Layered source coding is now a mature technique employed in many multimedia standards. For instance, the image-coding standard JPEG-2000 and the video coding standard MEPG-4 what is sometimes referred to as "fine granularity scalability," which enables a gradual tradeoff between the error-free data throughput and the quality of the reconstructed image or video sequence. Such progressive source coding methods are already in use in many Internet applications where data rate can be traded for quality, and they are expected to play an instrumental role for the next generation of wireless standards to provide ubiquitous access both to the Internet, and to diverse sources of streaming video and audio. It is envisioned that in some existing applications, the basic message may be a voice message or a control message that must be delivered to several radios.

There remains a need for exploiting the additional capacity of some of the links to deliver data simultaneously to the more capable receivers with higher complexity. Namely, the more-capable radios in a store-and-forward network could be used to advance a data packet toward its destination while they are also handling voice messages, or a voice packet can be forwarded to a more-capable radio at the same time that a network control packet is being sent.

Therefore, there is a need in the art for improved system and method for use not only in RF band but more advantageous in base band, also a further need for improved system and method that can adopt both coherent receiver and non-coherent receiver.

In these situations, it could be understood that fading conditions change so rapidly that channel estimation is difficult or require too many training symbols. Therefore, it is desirable to avoid channel estimation in order to reduce the cost and complexity of the handset.

It is further desirable to develop new wireless communication methods that achieve a higher spectral efficiency (data rate per unit bandwidth) and deliver image efficiently for a given power expenditure.

SUMMARY OF THE INVENTION

In one aspect of the present invention, a transmitting method for multimedia multicast in a wireless communication system, is proposed. The transmitting method comprises: (a) encoding a basic message using Unitary Space-time coding scheme; (b) encoding an additional message using space-time coding scheme; (c) delaying the result in (b) by T symbol periods; (d) combining the result in (b) with the result in (c); (e) combining the result in (a) with the result in (d); (f) post processing the result in (e) in order to make the signal ready for transmitting; and (g) transmitting the result in (f) using at least one transmitter antenna.

According to the present invention, (e) satisfies the subsequent equation:

$$S(k) = \sqrt{T} B_p(k) D_q(k), k=1,2\ldots$$

where

T is the number of signal periods being delayed, Bp is the result in (a), Dq is the result in (b), and S is the result in (e).

In another aspect of the present invention, a receiving method for multimedia multicast in a wireless communication system is proposed. The receiving method comprises: (a) receiving a signal; (b) pre-processing the received signal in order to make it ready for decoding; (c) decoding the basic message using noncoherent or coherent decoding scheme; (d) delaying the result in (b) by T symbol periods; (e) delaying the result in (c) by T symbol periods; and (f) based on the results in (b), (c), (d) and (e), decoding the additional message using differential decoding scheme.

According to the present invention, (c) satisfies the subsequent equation:

$$\hat{B}_p(k) = \arg\max_{B_l \in \Omega_B} tr\{Y^+(k)(B_p)_l(B_p)_l^+ Y(k)\}$$

while (f) satisfies the following equation, $$\hat{D}_q(k) = \arg\min_{A_{ql} \in \Omega_A} \left\| \hat{B}_p^+(k)Y(k) - (A_q)_l \hat{B}_p^+(k-1)Y(k-1) \right\|$$

where

Y is the result in (b), $\hat{B}_p$ is the result in (c), Bp belongs to a basic message set, $\hat{D}_q$ is the result in (f) and Aq belongs to an additional message set.

In yet another aspect of the present invention, transmitting device for multimedia multicast in a wireless communication system is proposed. The transmitting device comprises: a basic message encoder using Unitary Space-time coding scheme; at least one additional message encoder using multiple-antenna differential coding scheme; at least one delayer for delaying any input message by T symbol periods; at least one operational device for combining any input messages by multiplication and addition; a post processor for processing the combined signal output from said operational device in order to make the combined signal ready for transmitting; and at least one transmitter antenna.

According to the present invention, the operational device satisfies the subsequent equation:

$$S(k) = \sqrt{T} B_p(k) D_q(k), k=1,2\ldots$$

where

T is the number of signal periods being delayed, Bp is the output of the basic message encoder, Dq is the output of the additional message encoder, and S is the output of the operational device.

In further another aspect of the present invention, a receiving device for multimedia multicast in a wireless communication system is proposed. The receiving device comprises: at least one receiver antenna for receiving a signal; a pre-processor for processing the received signal in order to make it ready for decoding; a basic message decoder using noncoherent or coherent decoding scheme; at least one additional message decoder using differential decoding scheme; at least one delayer for delaying any input message by T symbol periods.

According the present invention, the basic message decoder satisfies the subsequent equation:

$$\hat{B}_p(k) = \arg\max_{B_l \in \Omega_B} tr\{Y^+(k)(B_p)_l(B_p)_l^+ Y(k)\}$$

while the additional message decoder satisfies the following equation, $$\hat{D}_q(k) = \arg\min_{A_{ql} \in \Omega_A} \left\| \hat{B}_p^+(k)Y(k) - (A_q)_l \hat{B}_p^+(k-1)Y(k-1) \right\|$$

where

Y is output of the pre-processor, $\hat{B}_p$ is the output of the basic message decoder, Bp belongs to a basic message set, $\hat{D}_q$ is output of the additional message decoder and Aq belongs to an additional message set.

DETAILED DESCRIPTION OF THE PREFERRED EMBODIMENTS

The technical features of the present invention will be described further with reference to the embodiments. The embodiments are only preferable examples without limiting to the present invention. It will be well understood by the following detail description in conjunction with the accompanying drawings.

According to one embodiment of the present invention, a new signalling scheme is proposed, which is to be applied to the multimedia multicast in the mobile wireless network. This scheme can be used in the Multiple Input Multiple Output (referred as MIMO hereafter) system as well as Single Input Single Output (referred as SISO hereafter) system.

1. Multi-Rate Transmission

Consider a communication link comprising M transmitter antennas and N receiver antennas that operates in a Rayleigh flat-fading environment. Each receiver antennas respond to each transmitter antenna through a statically independent fading coefficient that is constant for 2T symbol periods. The fading coefficients change continuously according to a model such as Jakes (W. C. Jakes, Microwave Mobile Communications, Piscataway, N.J.: IEEE Press, 1993). The received signals are corrupted by additive noise that is statistically independent among the N receivers and the T symbol periods. The system is capable of sending basic information bits and additional information bits.

First, p base layer information bits are mapped into a unitary space-time (UST) signal Bp which is a matrix signal.

Second, q enhancement layer information bits are mapped in a matrix signal Aq. The differential transmission scheme sends the matrices Dq as following:

$$D_q(k) = A_q(k) D_q(k-1)$$

$$D_q^+(0) D_q(0) = I_M$$

Third, the differential signal is multiplied by the unitary space-time modulation signal.

$$S(k) = \sqrt{T} B_p(k) D_q(k), k=1,2\ldots$$

Figure 1:
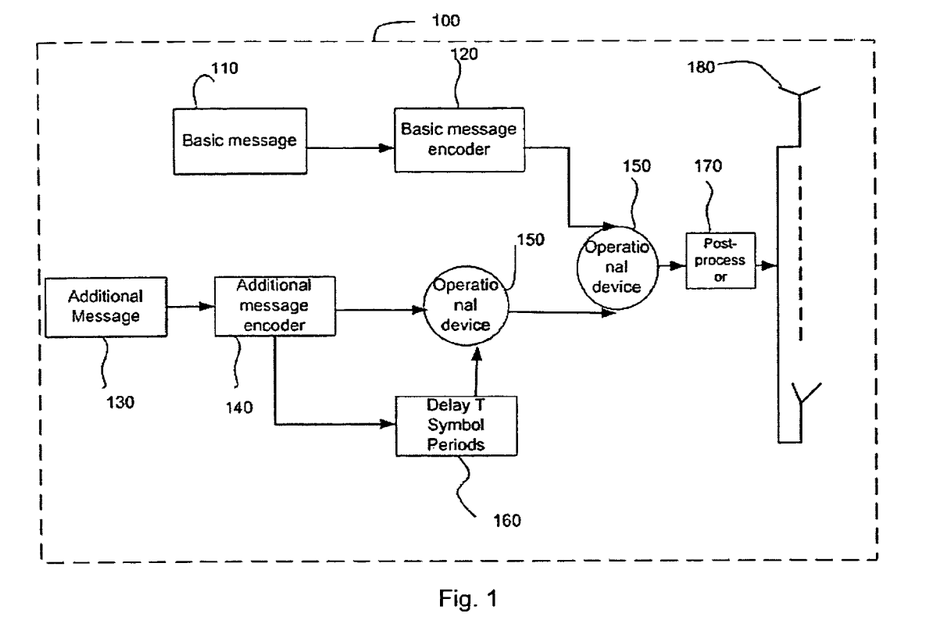
FIG. 1 is a block diagram showing the schematic framework of the transmitting device according to the present invention.

Finally, the matrix signal S (T×M) is transmitted during T-symbol interval by M transmitter antennas. Please refer to FIG. 1, 110 is the basic message source, 120 is the basic message encoder which mapping every p bit basic message bit information into one Bp matrix, 130 is the additional message source, 140 is the additional message encoder which mapping every q bit additional message bit information into one Aq matrix, 150 is an operational device, which performs matrix multiplication operation, 160 is a T-symbol-period delayer, the matrix Aq is multiplied with the former matrix Dq(k−1) and get current required matrix Dq, then every item in matrix signal Dq is processed in post-processor 170 and transmitted by antennas 180. It could be understood by the skilled in the art that the framework is flexible and can accommodate all rates and any number of antennas.

2. Low-Power and Low-Complexity Design in the Multimedia Multicast Transmission

At the transmitter, the process of encoding can be done by indexing a look-up table, which can simplify the encoder design. In general, we can construct structured signal constellation such as diagonal constellations disclosed in the following references:

B. M. Hochwald and T. L. Marzetta, "Unitary space-time modulation for multiple-antenna communication in Rayleigh flat fading," IEEE Trans. Inform Theory. Vol 46, March 2000:543~564

B. M. Hochwald and W. Sweldens, "Differential unitary space-time modulation," IEEE Trans. Communication, Vol48, December, 2000:2041~2052

Brian L. Hughes, "Differential Space-Time Modulation," IEEE Trans. Information Theory, Vol. 46, No. 7 November 2000: 2567~2578

A. Shokrollahi, B. Hassibi, B. M. Hochwald and W. Sweldens, "Representation Theory for High-Rate Multiple-Antenna Code Design," IEEE Trans on Inform Theory, Vol. 47, No. 6, September 2001:2335~2367

B. M. Hochwald, T. L. Marzetta, T. J. Richardson, W. Sweldens and Rudiger, "Systematic Design of Unitary Space-time Constellations," IEEE Trans. Inform Theory, Vol 46, September 2000:1962~1973

Then only one antenna transmits at any given time. In the implementation we can use only one power amplifier or M amplifiers. If only one power amplifier is used, it can be switched on among the antennas. But this amplifier must be turned on for M-times to transmit a matrix signal. It could be easily understood that hardware cost is greatly saved in this way. The other method is using an array of M amplifiers simultaneously driving the other antennas. Consequently, this amplifier needs to have a larger linear operating range than an amplifier array would. Amplifiers with a large linear range are often expensive to design and build. It may therefore occasionally be desirable to have all M antennas transmitting simultaneously at a lower power level.

Figure 2:
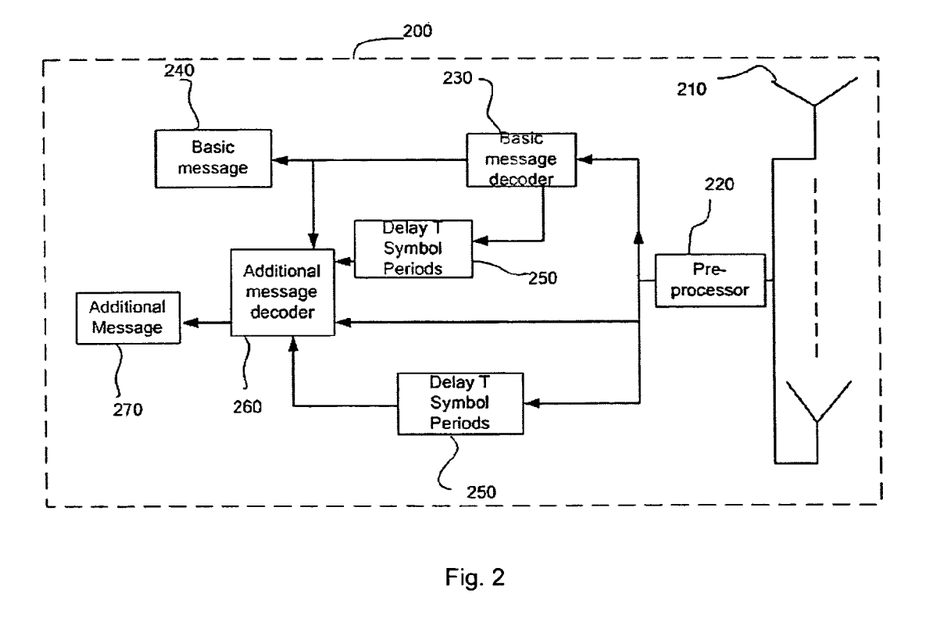
FIG. 2 is a block diagram showing the schematic structure of the receiving device according to the present invention.

Then we may adopt Maximum Likehood (referred as ML hereafter) receiver when channel coefficients matrix H is unknown and, for comparison, when H is known to the receiver (H is never known to the transmitter). It is customary to call the former receiver noncoherent and the latter receiver coherent. Here we concentrate on noncoherent receiver as shown in FIG. 2. The signal is received by receiver antennas 210. The received signal Y(k) is processed in pre-processor 220. And then it is delivered to the basic message decoder 230. The delayer 250 delays the signal T symbol periods to get signal Y(k−1). The basic message decoder 230 decoded the received signal and gets basic message $\hat{B}_q(k)$ 240. The processed message from the pre-processor 220 also is delivered to another delayer 250. The delayer 250 delays $\hat{B}_q(k)$ T symbol periods and gets the delayed information $\hat{B}_q(k-1)$. The decoded basic message $\hat{B}_q(k)$, the delayed decoded basic message $\hat{B}_q(k-1)$, the received information Y(k) and the delayed received information Y(k−1) are inputted into the additional message decoder 260. Then the additional message decoder 260 outputs the decoded additional message $\hat{A}_q$ 270.

For the non-coherent receiver, we can get as following:

First, we decode the received signal to estimate basic message according to ML criterion.

$$\hat{B}_P(k) = \arg\max_{B_l \in \Omega_B} tr\{Y^+(k)(B_P)_l (B_P)_l^+ Y(k)\}$$

Second, ML demodulator for the additional message is:

$$\hat{D}_q(k) = \arg\min_{A_{ql} \in \Omega_A} \left\| \hat{B}_P^+(k) Y(k) - (A_q)_l \hat{B}_P^+(k-1) Y(k-1) \right\|$$

Supposed that the estimated basic message $\hat{B}_p$ is right and we then can estimate the additional message $\hat{D}_q$. Since the basic message may be control message or more important message than additional message, this supposition is reasonable. The skilled in the art will apprehend that conventional decoding algorithm could be applied in the coherent receiver design.

3. High Performance in the Mobile Wireless Network

This scheme can be used in the MIMO system as well as SISO system. MIMO technology significantly enhances system performance. Using proper space-time coding, it is possible to use the degrees of freedom of the MIMO channel both to increase the throughput and to counteract fading.

This proposed scheme combined USTM and differential space-time modulation effectively. USTM achieve high performance at mobile wireless environment even without training sequences or knowledge of the propagation matrix. For example, within a single coherence interval of duration T=16, for M=7 transmitter antennas and N=4 receiver antennas, and an 18 dB expected SNR, a total of 80 bits can theoretically be transmitted with a block probability of error less than $10^{-9}$. The differential space-time modulation is derived from unitary space-time modulation and achieve good performance too.

The error probabilities of proposed system can be controlled by the selection of the different constellations. All do not need any training or knowledge of the propagation matrix.

In order to evaluate the performance of proposed system, we perform simulations. The results prove that the new signaling scheme can work well in both SISO and MIMO systems. The base layer message can be demodulated independently. The transmission of the enhancement layer message does not degrade the performance of base layer message performance. If the proposed signaling scheme is used in MIMO system, the transmit diversity and coding gain will improve the system performance. Suppose the channel model is that the maximum non-direction Doppler frequency in cycles per sample period is $f_d$=0.01 cycles/sample and the transmitted signal has an average expected power equal to one.

Specifically at M=1 and 2 transmitter antennas and N=1 receiver antennas. Here we choose the following code where the rate for the base layer message is 1 bits/s/Hz and the rate for the additional message is 3/8 bits/s/Hz. So the total spectral efficiency is 11/8. The unitary space-time signal constellation is constructed as following:

If the number of transmitter antennas is M=1, $$B_8 = \Theta_1^{l_1} \Theta_2^{l_2} \Theta_3^{l_3} \Theta_4^{l_4} (B_8)_0$$

Figure 3:
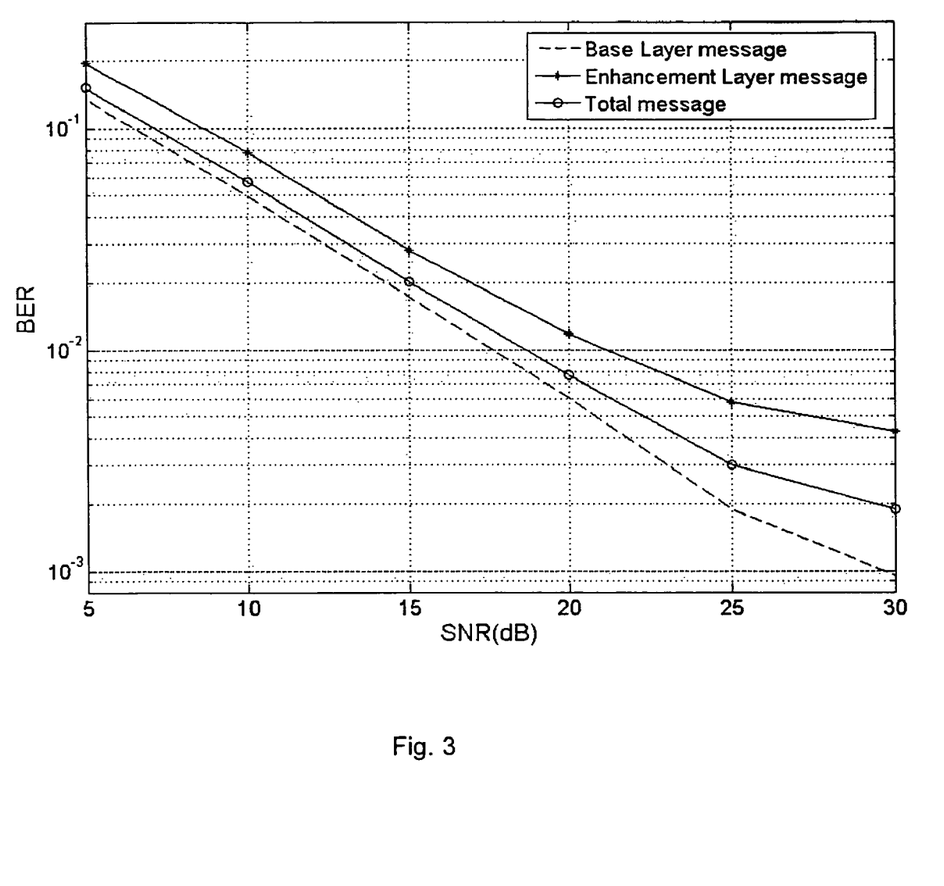
FIG. 3 is a schematic diagram showing the performance under Rayleigh flat-fading channel for M=1 transmitter antenna.

-continued $\Theta_i = \text{diag}(\exp(j2\pi u_1/L_i), \cdots \exp(j2\pi u_t/L_i))$, $0 \le u_1, \cdots u_t \le L_i - 1$, $i = 1, \cdots 4$ $(B_8)_0 = \frac{1}{\sqrt{8}} [1 \ 1 \ 1 \ 1 \ 1 \ 1 \ 1 \ 1]^T$ $([u_1 \cdots u_t])_1 = [1 \ 0 \ 0 \ 0 \ 1 \ 0 \ 3 \ 1]$ $([u_1 \cdots u_t])_2 = [0 \ 1 \ 0 \ 0 \ 3 \ 1 \ 1 \ 2]$ $([u_1 \cdots u_t])_3 = [0 \ 0 \ 1 \ 0 \ 2 \ 0 \ 2 \ 3]$ $([u_1 \cdots u_t])_4 = [0 \ 0 \ 0 \ 1 \ 1 \ 1 \ 3 \ 2]$ The enhancement layer message is coded as Octal-DPSK signal. The BERs of the base layer message, the enhancement layer message and total message under different SNR are calculated. The results are shown in FIG. 3. In this simulation, the base layer message corresponds to the basic message while the enhancement layer message corresponds to the additional message. When SNR varies from 5 dB to 30 dB, the decoder of enhancement layer message can achieve lower BER than the decoder of base layer message. And with the increasing SNR, the decoder of enhancement layer message outperforms the decoder of base layer message more.

If the number of transmitter antennas is M=2, $B_8 = \Theta_1^{h_1}(B_8)_0$ $\Theta_1 = \text{diag}(\exp(j2\pi 7/257), \ldots \exp(j2\pi 60/257))$,
$\exp(j2\pi 79/257), \exp(j2\pi 187/257)$,
$\exp(j2\pi 125/257)), \exp(j2\pi 198/257), \exp(j2\pi 154/257)$ The additional message is differential coded.

Figure 4:
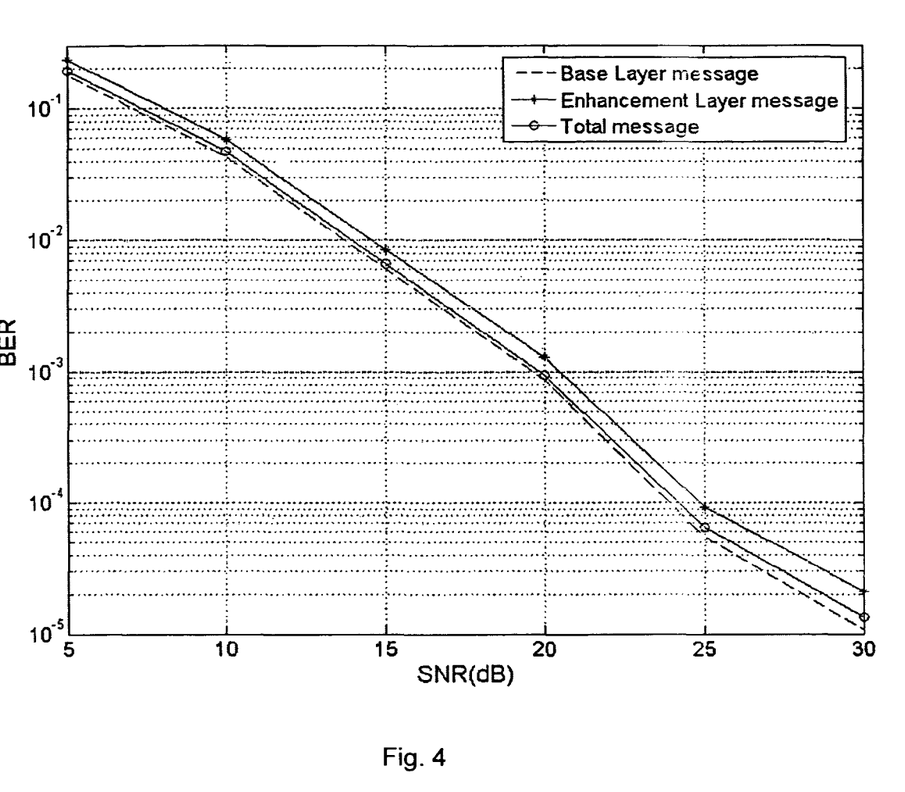
FIG. 4 is a schematic diagram showing the performance under Rayleigh flat-fading channel for M=2 transmitter antennas.

$A_8 = \left\{ \begin{bmatrix} 1 & 0 \\ 0 & 1 \end{bmatrix}, \begin{bmatrix} -1 & 0 \\ 0 & -1 \end{bmatrix}, \begin{bmatrix} j & 0 \\ 0 & -j \end{bmatrix}, \begin{bmatrix} -j & 0 \\ 0 & j \end{bmatrix}, \begin{bmatrix} 0 & j \\ j & 0 \end{bmatrix}, \right.$
$\left. \begin{bmatrix} 0 & -j \\ -j & 0 \end{bmatrix}, \begin{bmatrix} 0 & 1 \\ -1 & 0 \end{bmatrix}, \begin{bmatrix} 0 & -1 \\ 1 & 0 \end{bmatrix} \right\}$ The FIG. 4 shows the BERs of the base layer message, the enhancement layer message and total message under different SNR are calculated. In this simulation, the base layer message corresponds to the basic message while the enhancement layer message corresponds to the additional message. We may notice that the performance is improved compared to the FIG. 3 due to the transmit diversity and coding gain.

Figure 5:
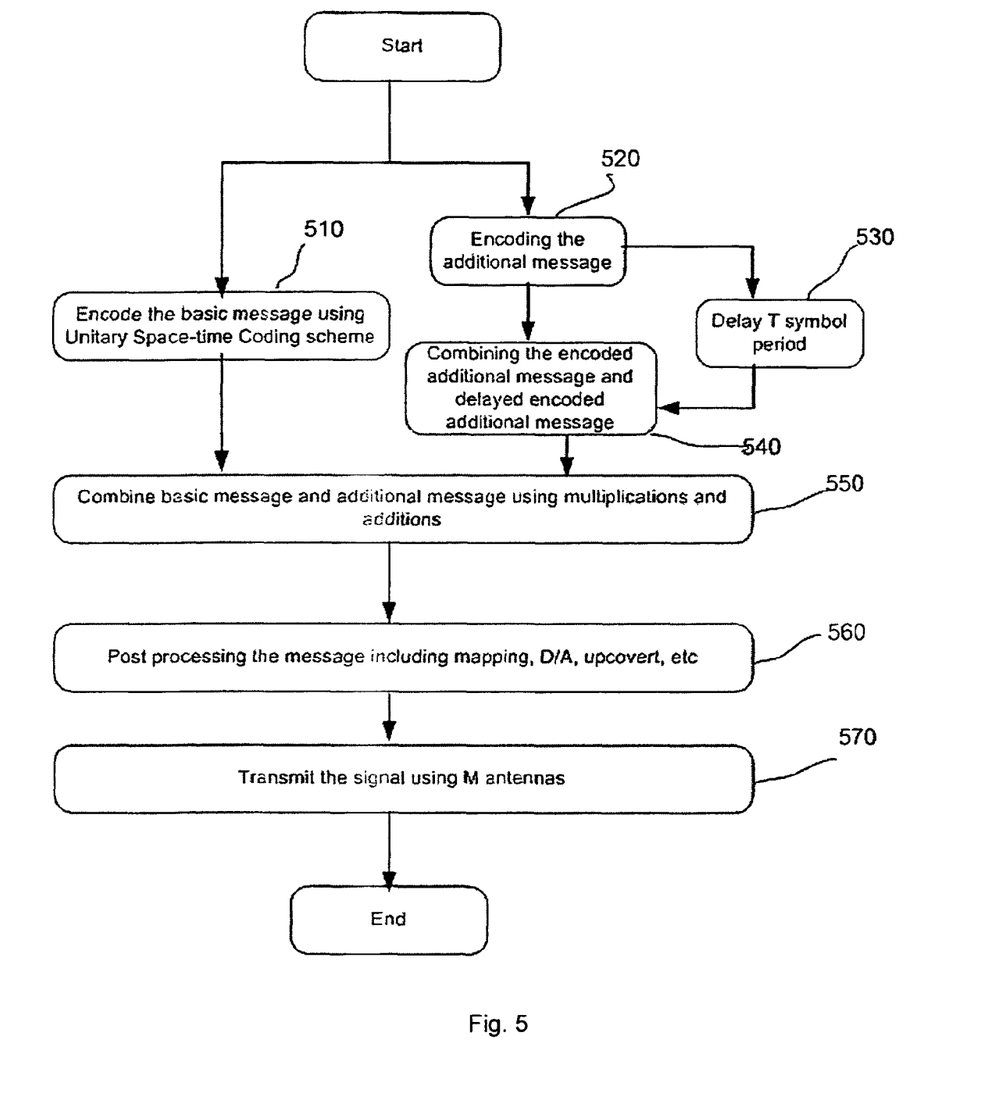
FIG. 5 is a flow chart showing a transmitting method for multimedia multicast transmission according to the present invention.

FIG. 5 depicts a transmitting method for multimedia multicast transmission according to one embodiment of the present invention. As shown in the figure, the basic message is encoded using Unitary Space-time Coding scheme in step 510. The additional message is encoded using multi-antenna encoding scheme in step 520. The output of encoded additional message is delayed T symbol periods in step 530. In step 540, the encoded additional message and the delayed encoded additional message are combined. The processing of Steps 520~540 forms multi-antenna differential coding scheme, which could be easily understood that it is independent from the processing of Step 510. Namely, the processing of Steps 520~540 are not based on the result of Step 510 and vice versa. Moreover, Steps 520~540 could be conducted prior to Step 510, simultaneously with Step 510, or after Step 510. The encoded basic message and the result in step 540 will be combined using multiplications and additions in Step 550. Then, the signal is post processed in Step 560. The post processing includes not limits to mapping, D/A, upconvert, etc. In Step 570, the signal is transmitted using M antennas.

Figure 6:
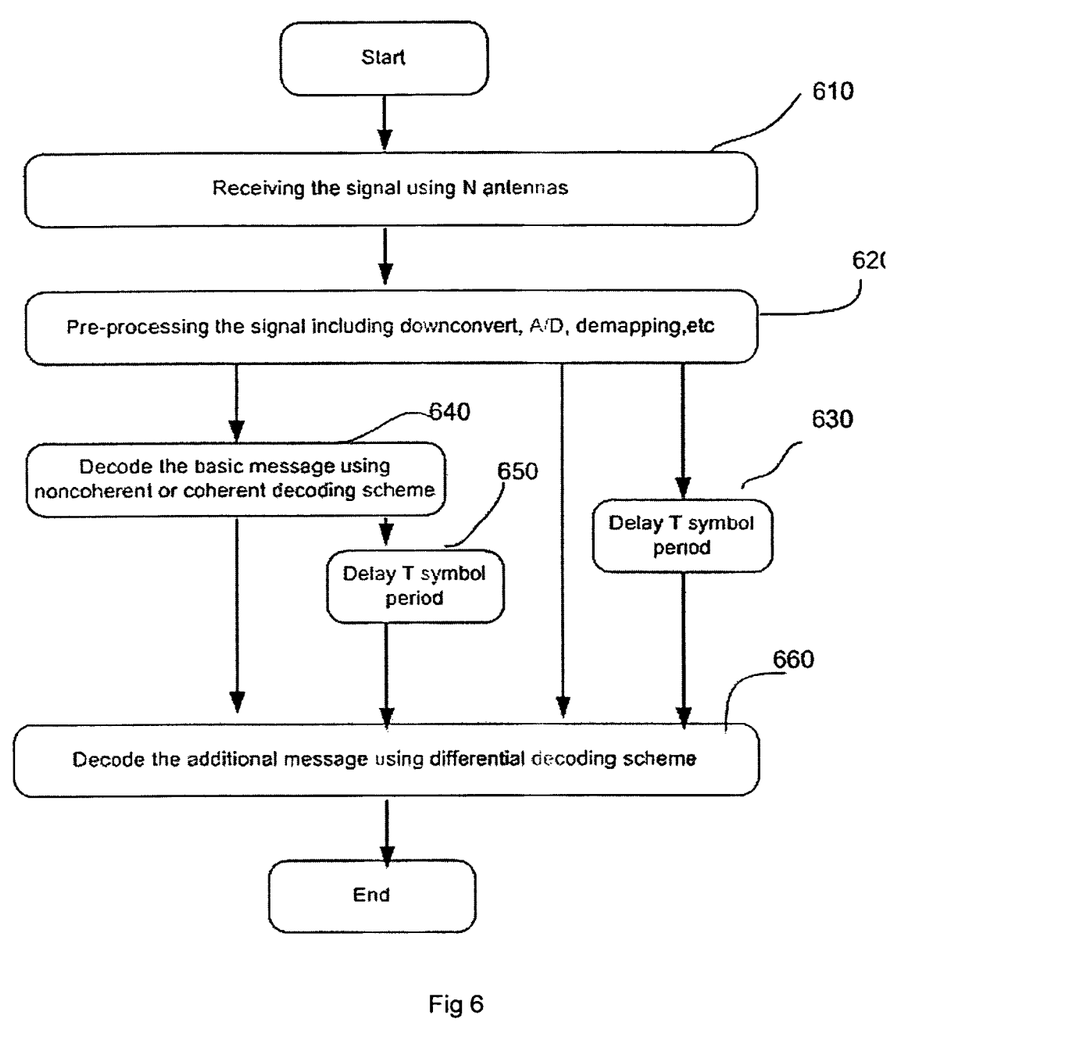
FIG. 6 is a flow chart showing a receiving method for multimedia multicast transmission according to the present invention.

FIG. 6 depicts a receiving method in multimedia multicast transmission according to one embodiment of the present invention. As shown in the figure, the signal is received using N antennas at the receiver's side in step 610. Then the signal is pre-processed in step 620. The said pre-processing includes not limits to downconvert, A/D, demapping, etc. The processed signal is delayed T symbol periods in step 630. Independent from the processing of step 630, the processed signal is decoded using noncoherent or coherent decoding in Step 640. The decoded basic message is delayed T symbol periods in step 650. Based on the pre-processed signal, the delayed pre-processed signal, the decoded basic message and the delayed decoded basic message, the additional message is decoded using differential decoding scheme in Step 660. It is very clear that the size of the combined message is not increased after the basic message is combined with the additional message according to the above-mentioned method. Therefore, the capacity of transmission is used more efficiently when compared with those conventional methods.

With the above specified implementations, the proposed receiver that attempts to demodulate the base layer message does not need to know whether enhancement layer message are included. Such receivers may demodulate the body of the packet without even knowing whether enhancement layer message is included. The signal constellation is designed in a way that provides disparity among the probabilities of different types of symbol errors, and this disparity has been exploited to send additional data to more-capable receivers at the same time that a multicast message is being delivered to all of its intended recipients. The enlarged constellation according to one embodiment of this invention can devote some bits per symbol to convey the control or basic message and some bits per symbol to convey the additional message, then the quality of the transmission is improved by delivering data information along with the control message to the same receiver.

As known, 3G and beyond technology is required to operate on very high moving speed. In such case, the accurate channel estimation will be difficult and complex. A further advantage is that the new signaling scheme enables the receiver to demodulate the signal without any channel knowledge at the transmitter or at the receiver for multimedia transmission.

A still further advantage is that the enhancement layer message according to one embodiment of this invention can carry information that is of less importance for reconstruction of the transmitted message than the base layer message is.

This invention can be applied in broadcasting transmission as well as multicast transmission, such as DVB-T, ATSC 8-VSB systems. It can also be used in multi-program operation or as a point-to-multipoint transmission.

Whilst there has been described in the forgoing description preferred embodiments and aspects of the present invention, it will be understood by those skilled in the art that many variations in details of design or construction may be made without departing from the present invention. The present invention extends to all features disclosed both individually, and in all possible permutations and combinations.

What is claimed is:

1. A transmitting method for multimedia multicast in a wireless communication system, comprising:
    (a) encoding a basic message using Unitary Space-time coding scheme;
    (b) encoding an additional message using a multiple antenna differential encoded space-time coding scheme;

(c) delaying a result of step (b) by T symbol periods;
(d) combining a result of step (b) with the result of step (c);
(e) multiplying the results of steps (a) and (d) in order to obtain a combined message;
(f) post processing a result of step (e) in order to make the signal ready for transmitting; and
(g) transmitting a result of step (f) using at least one transmitter antenna.

2. The method according to claim 1, wherein step (e) satisfies a subsequent equation:

$$S(k)=\sqrt{T}B_p(k)D_q(k), k=1,2,\ldots$$

where
Bp is a result of step (a), Dq is a result of step (b), and S is a result of step (e).

3. A receiving method for multimedia multicast in a wireless communication system, comprising:
(a) receiving a signal;
(b) pre-processing the received signal in order to make it the received signal ready for decoding;
(c) decoding a basic message using a noncoherent or a coherent Unitary Space-time decoding scheme; and
(d) delaying a result of step (b) by T symbol periods;
(e) delaying a result of step (c) by T symbol periods;
(f) decoding an additional message using a differential transmission space-time decoding scheme as a function of results of steps (b), (c), (d) and (e).

4. The method according to claim 3, wherein step (c) satisfies a subsequent equation:

$$\hat{B}_p(k) = \arg\max_{B_l\in\Omega_B} tr\{Y^+(k)(B_p)_l(B_p)_l^+ Y(k)\}$$

while (f) satisfies the following equation, $$\hat{D}_q(k) = \arg\min_{A_{ql}\in\Omega_A} \left\|\hat{B}_p^+(k)Y(k) - (A_q)_l\hat{B}_p^+(k-1)Y(k-1)\right\|$$

where
Y is a result of step (b), $\hat{B}_p$ is a result of step (c), Bp belongs to a basic message set, $\hat{D}_q$ is a result of step (f) and Aq belongs to an additional message set.

5. A transmitting device for multimedia multicast in a wireless communication system, comprising:
a basic message encoder for encoding a basic message using Unitary Space-time coding scheme;
at least one additional message for encoding an additional message using a multiple-antenna differential transmission space-time coding scheme;
delay means for delaying an output of the additional message decoder by T symbol periods;
at least one operational device for combining the output of the basic message encoder, the output of the additional message encoder and the output of the delay means by multiplication and addition;
a post processor for processing a combined signal output from said operational device in order to make a combined signal ready for transmitting; and
multiple transmitter antennas through which a signal output from said post processor is transmitted.

6. The transmitting device according to claim 5, wherein said operational device satisfies a subsequent equation:

$$S(k)=\sqrt{T}B_p(k)D_q(k), k=1,2,\ldots$$

where
Bp is an output of the basic message encoder, Dq is an output of the additional message encoder, and S is an output of the operational device.

7. A receiving device for multimedia multicast in a wireless communication system, comprising:
a receiver antenna for receiving a signal;
a pre-processor for processing the received signal from the receiver antenna in order to make it ready for decoding;
a basic message decoder for decoding a basic message out of the received signal processed by the pre-processor using a noncoherent or a coherent Unitary Space-time decoding scheme;
delay means for respectively delaying the received signal processed by the pre-processor and the basic message decoded by the basic message decoder by T symbol periods; and
at least one additional message decoder for decoding an additional message based on inputs from the received signal processed by the pre-processor, the basic message decoded by the basic message decoder, the delayed received signal from the delay means and the delayed basic message from the delay means, said additional message decoder using a differential transmission space-time decoding scheme.

8. The receiving device according to claim 7, wherein said basic message decoder satisfies a subsequent equation:

$$\hat{B}_p(k) = \arg\max_{B_l\in\Omega_B} tr\{Y^+(k)(B_p)_l(B_p)_l^+ Y(k)\}$$

while said additional message decoder satisfies the following equation, $$\hat{D}_q(k) = \arg\min_{A_{ql}\in\Omega_A} \left\|\hat{B}_p^+(k)Y(k) - (A_q)_l\hat{B}_p^+(k-1)Y(k-1)\right\|$$

where
Y is an output of the pre-processor, $\hat{B}_p$ is an output of the basic message decoder, Bp belongs to a basic message set, $\hat{D}_q$ is an output of the additional message decoder and Aq belongs to an additional message set.

* * * * *